Figure 2:
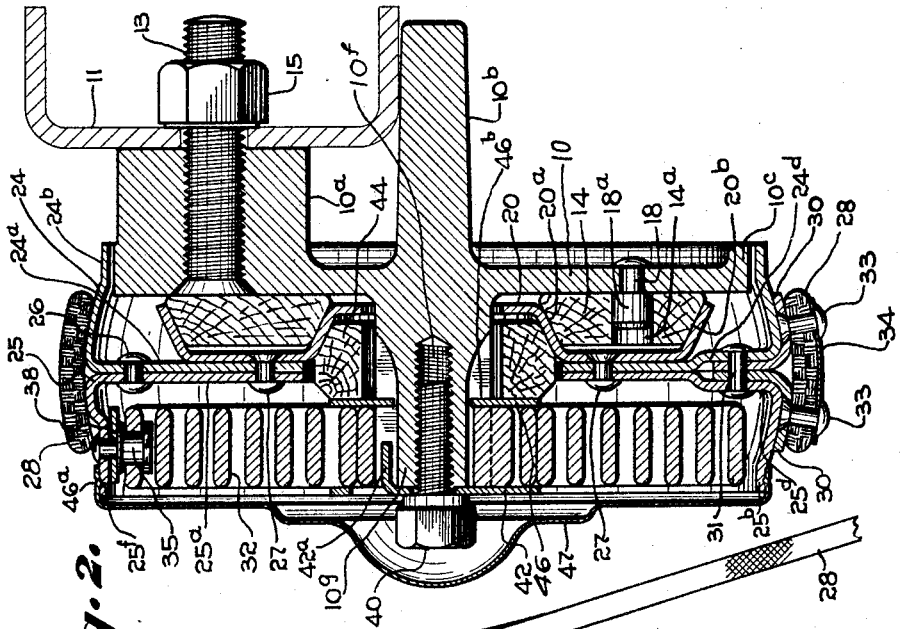

Jan. 31, 1928.                                              1,657,503
R. H. HASSLER
REBOUND CHECK
Filed Feb. 14, 1925                         3 Sheets-Sheet 1

INVENTOR
Robert H. Hassler,
By Raymond F. Buckley.
ATTORNEY

Jan. 31, 1928.                                                    1,657,503
R. H. HASSLER
REBOUND CHECK
Filed Feb. 14, 1925                      3 Sheets-Sheet 2
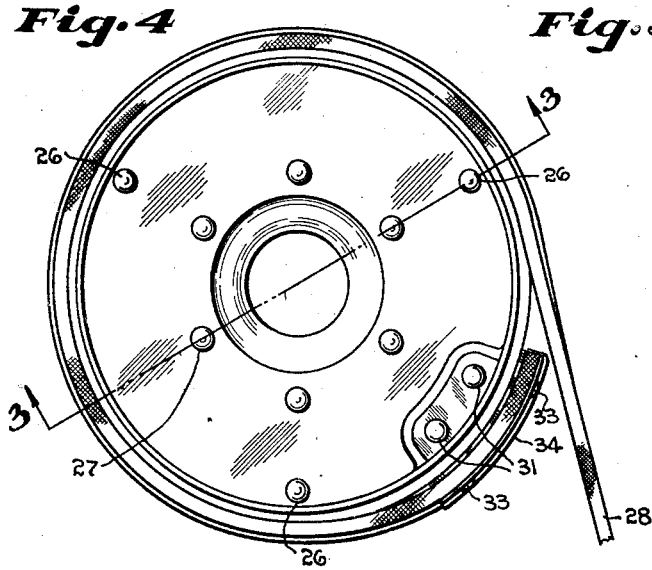
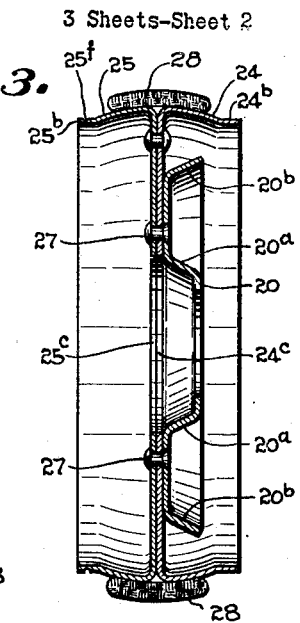
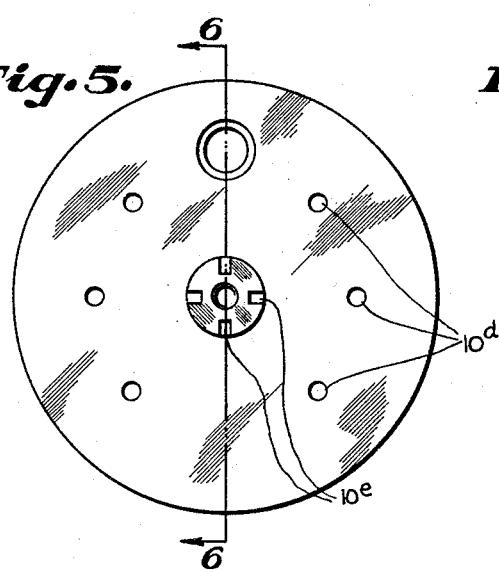
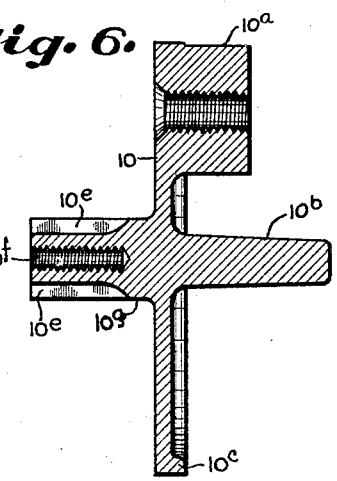
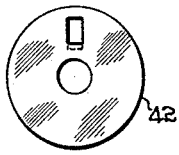
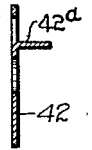
INVENTOR
Robert H. Hassler,
By Raymond F. Buckley.
ATTORNEY Jan. 31, 1928.　　　　　　　　　　　　　　　1,657,503
R. H. HASSLER
REBOUND CHECK
Filed Feb. 14, 1925　　　　　3 Sheets-Sheet 3
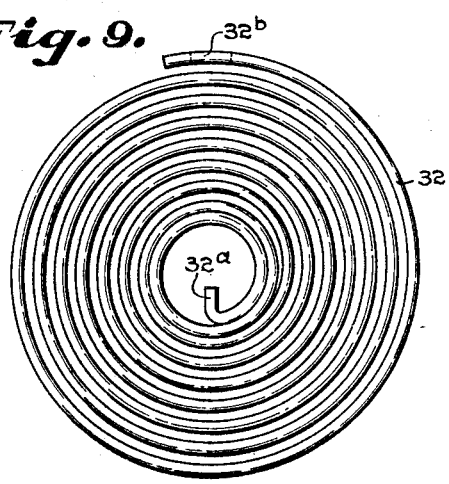
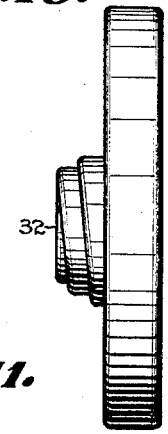
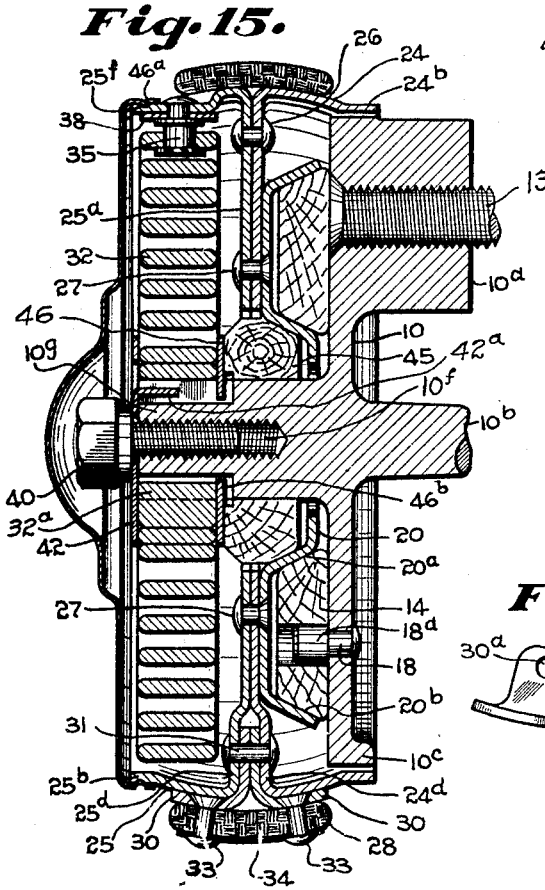
INVENTOR
Robert H. Hassler,
By Raymond F. Buckley
ATTORNEY Patented Jan. 31, 1928.

1,657,503

UNITED STATES PATENT OFFICE.

ROBERT H. HASSLER, OF INDIANAPOLIS, INDIANA, ASSIGNOR, BY MESNE ASSIGNMENTS, TO HASSLER MANUFACTURING CO., INC., OF INDIANAPOLIS, INDIANA, A CORPORATION OF DELAWARE.

REBOUND CHECK.

Application filed February 14, 1925. Serial No. 9,197.

This application relates to an improvement in rebound checks described in an earlier co-pending application filed December 27, 1924, Serial No. 758,453, by Robert H. Hassler, entitled "Rebound check", now Patent No. 1,586,799, granted June 1, 1926.

My invention has for its object to produce a simple, compact, efficient, and durable rebound check which is adapted to be connected between two relatively movable members of an automotive vehicle chassis, and which will effectively retard the sudden recoil action of the main suspension springs after they have been compressed. The principal object of this invention is to provide a rebound check of the one-way acting type which can be mounted upon a vehicle chassis and connected by a flexible strap to the axle so that said vehicle will be free to move downwardly as the springs compress. When rebounding from the compressed position, the flexible strap is drawn taut and cooperates with the friction device thereby preventing a rapid upward movement of the spring suspended parts, because a predetermined resistance set up by the friction device must first be overcome.

Another object of the invention is to provide a construction wherein the force or strain to which the rebound check is subjected, is exerted upon the friction creating members.

Still another object of the invention is to provide a novel floating type thrust bearing which is adapted to transmit the pressure from the pressure exerting means to the friction cup.

A still further object of the invention is to provide a journal or hub support which is formed integral with the supporting member and which is adapted to provide an adjustment for changing the pull characteristics of the absorber.

Still a further object of the invention is to provide a construction in which means are provided for anchoring the flexible strap to the rebound check drum.

Another object of the invention is to provide a drum or casing which is simple in construction and inexpensive to manufacture, and which is adapted to permit the flexible strap element to wind on the external surface thereof.

A still further object of the invention is to provide a hub construction, provided with a plurality of slots, anyone of which affords means for anchoring the inner extremity of the spiral spring.

It is also the object of the invention to provide a rebound check which has parts of simple construction; which are strong and durable; which will not easily get out of order; which can be readily applied to vehicles already in use, or furnished as a regular part of the initial equipment thereof; and which can be manufactured at a normal cost and still operate efficiently to obtain the desired restraining effect.

The invention may be briefly summarized as consisting of certain novel details of construction, combinations and arrangements of parts which will be described in the specifications and pointed out in the appended claims.

Figure 1:
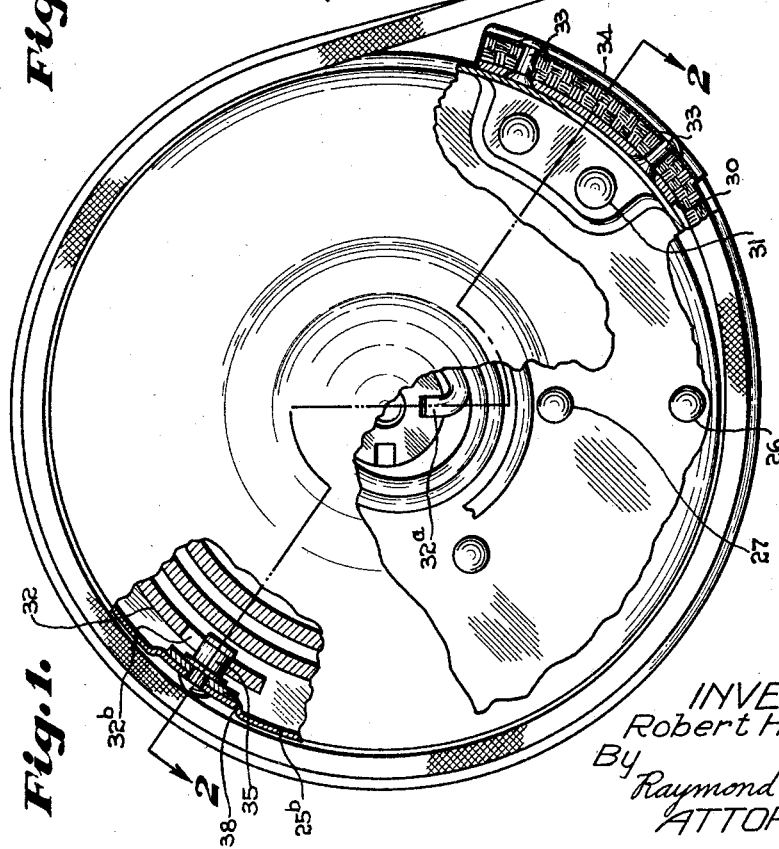

In the accompanying drawings, forming a part of the specifications, Figure 1 illustrates a side elevation of the rebound check assembly with fragments broken away, to show some of the working parts therein. Fig. 2 is a cross sectional view of Fig. 1 shown mounted on the frame portion of a vehicle chassis and is taken approximately on the line 2—2 in Fig. 1. Figs. 3 to 12 inclusive are drawn at a reduced scale; Fig. 3 being a cross-sectional view of the oscillating drum, taken on the line 3—3 in Fig. 4, and illustrates the arrangement of some of the parts connected thereto. Fig. 4 is a side elevation of Fig. 3. Fig. 5 is a side elevation of the hub support, and Fig. 6 is a cross-sectional view taken on the line 6—6 in Fig. 5. Fig. 7 is a side elevation of the locking washer and Fig. 8 an end elevation thereof. Fig. 9 is a side elevation of the rebound check spring, and Fig. 10 an end elevation thereof. Fig. 11 is a side elevation of the pressure plate. Fig. 12 is a side elevation of the friction disk. Fig. 13 is a full-size, side elevation of the flexible strap anchor plate, and Fig. 14 an end elevation thereof. Fig. 15 is a full size, sectional view of the device showing a modified form thereof.

Referring to the drawings, 10 represents a hub support, by means of which the rebound check is mounted on the frame 11, and secured thereto by means of a securing bolt 13 and a nut 15. The securing bolt 13 has provided on its body external screw threads which engage with internal screw threads in a boss portion $10^a$ formed on the hub support 10. $10^b$ represents an outwardly disposed lug or stop which is adapted to engage against the lower flange of the frame member 11 and thereby prevents independent rotation of the rebound check unit when secured in position on the frame. $10^c$ represents an expanded circular flanged portion which forms a cover for one side of the device, and upon which the friction disk 14 is non-rotatably mounted. The friction disk is preferably made of a hard wood, impregnated with a lubricating compound. The flanged portion $10^c$ is provided with a plurality of apertures $10^d$ into which are inserted a plurality of dowel pins 18, these being preferably riveted in place. These pins are provided with enlarged portions on one extremity, indicated by the ordinal $18^a$, which are tightly fitted to and inserted in a series of apertures $14^a$ provided in the friction ring 14. These pins when inserted in place prevent independent rotation of the friction ring 14 with respect to the hub support 10. 20 represents a conical friction cup which has provided therein a pair of conical friction surfaces; $20^a$ indicating the small diameter surface and $20^b$ the large diameter surface. It will be observed that the small conical surface $20^a$ is inverted with respect to the large surface $20^b$. They are adapted to snugly engage with mating conical surfaces which are provided on the friction ring 14. The friction cup 20 is non-rotatably mounted on a pair of cup shaped members 24 and 25 respectively by means of a plurality of rivets 27. The members 24 and 25 are provided with flat circular disk portions $24^a$ and $25^a$ respectively, each of which blend into outwardly disposed flanges $24^b$ and $25^b$ respectively. The disk portions are arranged adjacent one another and are secured together, in the present instance, by a plurality of rivets 26 and 27; the rivets 27 also serving to attach the friction cup in operative position on member 24. The disks $24^a$ and $25^a$ have provided in their central portions large apertures $24^c$ and $25^c$ respectively.

28 represents a flexible belt or strap which operates on the external surface of the drum or pulley portion which is formed due to the relative position of the flanges $24^b$ and $25^b$. Depressions or pocket portions $24^d$ and $25^d$ are formed in the members 24 and 25 respectively, which provide means into which the flexible strap can be anchored. A strap anchor plate 30 is held securely therein by means of rivets 31—31 which are inserted into apertures $30^a$—$30^a$ in the anchor plate 30 and in mating apertures in the pockets $24^d$ and $25^d$ respectively. The flexible strap at one extremity is secured to the anchor plate 30 by means of a plurality of rivets 33 and a clamping plate 34.

32 represents a spiral spring which is anchored at its outer extremity to a headed pin 35; the pin being securely anchored to the flange $25^b$. A flat circular washer 38 reinforces the flange $25^b$. A predetermined number of the smaller convolutions of the spring are pushed outwardly when forming the spring and before tempering, which convolutions are illustrated in Fig. 10; and when they are forced into a flattened position, illustrated in Fig. 2, a resistance or an end pressure is exerted by the spring. This end pressure is utilized for the purpose of forcing the friction cup 20 in frictional engagement with the ring 14.

$10^g$ represents a cylindrical hub portion which is horizontally disposed from the central flange or disk portion $10^c$ of the supporting member 10. The hub is provided with a plurality of grooves $10^e$. 40 represents a cap screw which engages in a hollow threaded portion $10^f$ provided in the horizontal axis of the hub $10^g$.

42 represents a pressure plate which is interposed between the central pressure exerting coils of the spring 32 and the head of the cap screw 40. It has a transversely disposed ear $42^a$ which is inserted in one of the grooves and thereby prevents the washer from rotating therein, due to the rotary action of the spiral spring.

44 represents a thrust bearing which I have provided to be interposed between the friction cup 20 and the pressure exerting portion of the spring 32. The thrust bearing is preferably made of a hard wood which is impregnated with a lubricating compound rendering it self-lubricating. A flat circular washer 46 is interposed between the thrust bearing and the pressure exerting coils of the spring 32 which protects the adjacent face of the thrust bearing. To prevent independent rotation of the washer 46 on the hub $10^g$, it is provided with a plurality of inwardly disposed lugs or keys $46^a$ which engage with key-ways $10^e$ in the hub $10^g$. The spring 32 is provided with an inwardly disposed lipped portion $32^a$ at its inner extremity, which engages in one of the slots $10^e$ of the hub $10^g$. The outer extremity of the spring 32 is anchored so as to rotate with the drum; this is effected by providing an aperture $32^b$ in the spring, which permits the spring to be slipped over the head of pin 35.

To exclude road grit, and foreign particles, I have provided a cup shaped cover 47 which fits snugly on the circular flanged portion $25^b$ of the member 25. The cover is provided with an annular bead 46<sup>b</sup> which mates with and snaps into a groove 25<sup>f</sup> formed in the flange 25<sup>b</sup>.

The torsion spring is so disposed that it tends constantly to wind up the strap on the drum. Therefore, when the main springs of the vehicle to which the device is attached are compressed, the slack of the strap is taken up by the rebound check mechanism; the torsion spring being made of sufficient pulling capacity and adjustability to overcome the frictional resistance created between the friction cup 20 and the friction ring 14. When compression of the main spring occurs, the spiral spring rotates the drum and winds the flexible strap thereon. When expansion or rebound action of the spring occurs, the strap which has been drawn taut on the compression stroke, immediately pulls upon and rotates the rebound check drum, the speed of which is retarded by means of the frictional drag created by the friction members. The amount of frictional resistance set up by these friction members depends upon the predetermined compressive strength of the central coils of the spring.

The construction is such that the radial loads or strains, exerted by the device, are carried directly by the friction members 14 and 20 instead of on a horizontally disposed central hub which is common to most rebound checks now in use.

It has been found that if only the large diameter friction surface is used, that the drum 20 tends to wabble or rotate out of true, with respect to vertical, when the strap exerts a sudden pull, but with my novel construction, such tendencies are obviated and the drum oscillates on a true plane at right angles to its horizontal axis. In a device of this nature, I have found it desirable to interpose the thrust bearing 44 between the pressure exerting portion of the spring and the friction cup 20. This thrust bearing is, in the present instance, permitted to float, as the arrangement of the parts is not such as to cause any positive predetermined movement with respect to the adjacent parts.

The central aperture in the thrust bearing is large enough in diameter so as to provide clearance between the hub 10<sup>g</sup> and the bearing. This construction relieves the hub of any vertical load being transmitted directly from the bearing. This clearance is advantageous as it eliminates the possibility of the parts becoming loose due to wear either on the hub or thrust bearing. The thrust bearing not only distributes the spring pressure equally on the periphery of, and at right angles to, the taper face of both the thrust bearing 44, and the adjacent taper face of the friction cup 20, but also provides a construction which automatically takes up any wear that may occur on the taper faces or on the perpendicular face of the thrust bearing adjacent the pressure plate 46.

In the modification shown in Fig. 15, the central aperture in the thrust bearing 44 is fitted to the hub and is adapted to take the vertical load as well as the horizontal load or end pressure imparted from the pressure exerting coils of the spring 32.

It will be observed from the illustrations that the cup-shaped members 24 and 25, the friction cup 20, the strap anchor 30, and the circular washers 42 and 46, are so designed that they can be made, if desired, of pressed steel stampings. The cup shaped members 24 and 25 have flanges so shaped and so disposed, that when secured together, the outer cylindrical surface forms a crowned pulley or drum for the strap to wind on.

Both the thrust bearing and the friction ring are preferably made of hard wood impregnated with a special lubricating compound. This combination of wood and lubricant has been found to give excellent results in preserving the wearing surfaces of both the friction ring and thrust bearing.

It is thus seen that the invention provides a simple, compact and durable construction requiring but comparatively few parts; one which will not easily get out of order; one which can be made of pressed steel stampings; and one in which any wear that might occur either on the friction ring or thrust bearing will be automatically compensated for.

While I have illustrated and described with particularity, one preferred and one modified form of my invention, I do not desire to be limited to the exact structural details thus illustrated and described; but intend to cover all forms and arrangements which come within the terms employed in the definition of my invention constituting the appended claims.

What I claim is:

1. In a rebound check, a friction element, an oscillating drum frictionally engaged with said element, and means for oscillating said drum, said oscillating drum comprising a pair of discs secured together having outwardly disposed cylindrical flanges.

2. In a rebound check, a friction element, an oscillating drum frictionally engaged with said element, and means for oscillating said drum, said oscillating drum comprising a pair of members, each member consisting of a disc portion and a flange, the disc portions of the two members being rigidly secured together and the flanges of the two members extending oppositely and outwardly from the disc portions.

3. In a rebound check, a friction element, an oscillating drum frictionally engaged with said element, and means for oscillating said drum, said oscillating drum comprising a pair of members, each member consisting of a disc portion and a flange, the disc portions of the two members being rigidly secured together and the flanges of the two members extending oppositely and outwardly from the disc portions, the inner portions of the flanges being larger in diameter than the outward portions thereof.

4. In a rebound check, a friction element, an oscillating drum frictionally engaged with said element, flexible means for oscillating said drum, said drum comprising a pair of members, each member consisting of a disc portion and a flange, the disc portions of the two members being rigidly secured together, and an anchor plate interposed between said disc portions for securing the flexible means thereto.

5. In a rebound check, a friction element, a pair of discs having oppositely disposed cylindrical flanges, flexible means for oscillating said flanged discs. and oppositely disposed angle plates interposed between said flanged discs for securing the flexible means thereto.

6. In a rebound check, a friction element, a drum comprising a pair of discs having oppositely disposed cylindrical flanges, flexible means for oscillating said drum, and an anchor plate having one portion thereof extending intermediate said discs and rigidly secured thereto, and another portion thereof lying substantially flush with said flanges and secured to said flexible means.

7. In a rebound check, a friction element, a pair of discs, means for oscillating said discs, a friction cup frictionally engaged with said element, and means for rigidly securing said cup to one of the said discs.

8. In a rebound check, a friction element, an oscillating drum, said oscillating drum comprising two members, each member consisting of a disc portion and a flange portion, a friction cup frictionally engaged with said element, and means for securing said cup to the disc portion of one of the two drum members.

9. In a rebound check, a friction element, an oscillating drum, flexible means for oscillating said drum, said drum comprising a pair of members, each member consisting of a disc portion of a flange, the disc portions of the two members being rigidly secured together, a friction cup frictionally engaged with said element and rigidly secured to said drum, and an anchor plate interposed between said disc portions for securing the flexible means thereto.

In witness whereof, I have hereunto set my hand at Indianapolis, Indiana, this 30th day of January, A. D. one thousand nine hundred and twenty five.

ROBERT H. HASSLER.